United States Patent Office 3,536,687
Patented Oct. 27, 1970

3,536,687
POLYMERS AND COPOLYMERS FROM CYCLO-HEXENYL-ALKYL ALCOHOL ESTER OF α,β-UN-SATURATED ACIDS
John David Nordstrom, Detroit, Mich., assignor to Ashland Oil, Inc., Houston, Tex., a corporation of Kentucky
No Drawing. Filed July 16, 1968, Ser. No. 745,117
Int. Cl. C08f 3/62, 15/16
U.S. Cl. 260—89.5      4 Claims

ABSTRACT OF THE DISCLOSURE

Cyclohexenyl-alkyl alcohol or alkylcyclohexenyl-alkyl alcohol esters of α,β-unsaturated acids are homopolymerized, or copolymerized with other α,β-unsaturated monomers to give resinous products which cross-link at room temperature by exposure to atmospheric oxygen. Cross-linking can be accelerated by the inclusion of catalysts (e.g. cobalt naphthenate, peroxides). The products are useful as coating resins.

This invention relates to cyclohexenyl-alkyl or alkyl-cyclohexenyl-alkyl alcohol esters of α,β-unsaturated acids and to resins which are the homopolymers and copolymers of these esters.

Acrylic copolymer resins are known and valuable components in coating compositions and are valued where exterior durability, color stability, and ease of handling are required. One property of acrylic resins which is undersirable in many applications is their sensitivity to solvents. It is known in the prior art to employ acrylic polymers having certain functional groups in conjunction with other resinous materials in order to improve the hardness and solvent resistance of the films. In order to be reactive with cross-linking agents, the acrylic copolymers must be specially designed with functional groups such as carboxyl, hydroxyl, amide, or epoxy groups. In general, heat and catalysts are required in addition to the reactive resin to cause the cross-linking reaction to occur. A resinous material having the film properties of acrylic resins which would air dry alone or with the use of minor amounts of catalysts without the addition of other resinous materials, and particularly without the necessity of heating, is highly desirable.

Accordingly, it is an object of this invention to provide novel acrylic polymers and copolymers.

A further object of this invention is to provide novel acrylic polymers and copolymers which may be oxidatively cross-linked in air at ambient temperatures without the additional resinous materials.

It is a further object of this invention to provide novel polymers and copolymers of acrylic monomers which polymers will cure at ambient temperatures in air without catalyst additives.

It is a further object of this invention to provide novel solvent soluble acrylic polymers which can be made solvent insoluble by curing at room temperature in the presence of catalysts.

Still other objects of this invention will be apparent to those skilled in the art from the following discussion.

The novel polymeric materials of the present invention are polymers and copolymers of a monomer which is an ester of a cyclohexenyl-alkyl alcohol or an alkyl-cyclohexenyl-alkyl alcohol and an α,β-unsaturated acid.

The acid from which the novel ester monomers of this invention are prepared is selected from the group consisting of α,β-unsaturated mono- or dicarboxylic acids. Examples of such acids include acrylic acid, methacrylic acid, crotonic acid, cinnamic acid, itaconic acid, maleic acid, and fumaric acid.

The inventive feature of the present invention is found in the alcohol portion of the ester monomer, which contains a cyclohexenyl-alkyl group. The alcohols which are esterified with an α,β-unsaturated acid have the Formula I

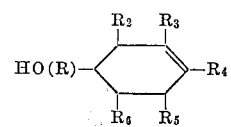

in which R is alkylene and preferably lower alkylene having 1 to 4 carbon atoms; $R_2$, $R_3$, $R_4$, $R_5$, and $R_6$ are hydrogen, alkyl (preferably lower alkyl having from 1 to 4 carbon atoms), halogen (preferably chlorine or bromine), or alkoxy (preferably lower alkoxy having 1 to 4 carbon atoms).

Representative of the cyclohexenyl-alkyl alcohols which can be esterified with the α,β-unsaturated acids are those having the formulae:

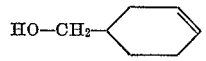    II

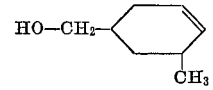    III

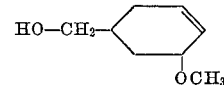    IV

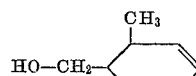    V

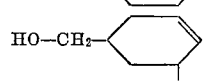    VI

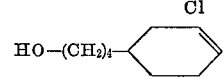    VII

The compounds which comprise the preferred monomer or comonomer in the novel acrylic resins of this invention have the Formula VIII:

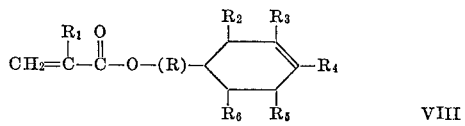    VIII in which R is alkylene and preferably lower alkylene having 1 to 4 carbon atoms; $R_1$ is hydrogen or methyl; $R_2$, $R_3$, $R_4$, $R_5$, and $R_6$ are hydrogen, alkyl (preferably lower alkyl having from 1 to 4 carbon atoms), halogen (preferably chlorine or bromine), or alkoxy (preferably lower alkoxy having from 1 to 4 carbon atoms).

The most preferred compounds under the generic Formula VIII are those in which R is methylene, and each of $R_2$, $R_3$, $R_4$, $R_5$, and $R_6$ is hydrogen or methyl.

The amount of the oxidizable cyclohexane-alkyl monomer to be incorporated in the polymer can be varied from 1 to 100% by weight, thus encompassing both homopolymers and copolymers of the oxidizable monomer. It is preferred that a minimum of about 10% by weight of the oxidizable cyclohexene-alkyl ester monomer be incorporated into the copolymers of this invention. In general, the greater the content of the cyclohexene ester monomer, the harder and more brittle the cured film becomes. Other properties of copolymers will depend upon the nature and percentage of the other comonomers.

The cyclohexenyl-alkyl alcohol or alkylcyclohexenyl-alkyl alcohol esters of α,β-unsaturated acids can be copolymerized with any of the α,β-unsaturated monomers known to be copolymerizable with saturated esters of such unsaturated acids (e.g. methyl methacrylate and ethyl acrylate) to form resinous materials. The term "copolymerizable monomers" as used herein is intended to encompass all of these monomers. Among the copolymerizable monomers useful in the practice of this invention are the lower alkanol esters of α,β-unsaturated acids, vinyl ester compounds, vinyl aromatic compounds, vinyl nitrile compounds, vinyl amide compounds, and the like. Specific monomers which fall under the above generic description include methyl acrylate, ethyl acrylate, propyl acrylate, butyl acrylate, methyl methacrylate, ethyl methacrylate, butyl methacrylate, methoxy ethylacrylate, ethoxy ethylacrylate, hydroxy propyl methacrylate, monobutyl crotonate di-butyl crotonate, mono-methyl maleate, monoethyl fumarate, dibutyl fumarate, acrylic acid, methacyclic acid, vinyl acetate, vinyl chloride, acrylonitrile, methacrylonitrile acrylamide, methacrylamide, N-methylol acrylamide, N-methylol methacrylamide, N-methylol-N-octyl methacrylamide, styrene, vinyl toluene, α-methyl styrene, chlorostyrene, and the like.

Among the most preferred comonomers are methyl methacrylate, ethyl acrylate, styrene, butyl acrylate, and hydroxy propyl methacrylate.

In preparing the copolymers of this invention, the particular monomers (and comonomers) used and the amounts thereof can vary and will be dependent upon the properties desired in the resultant copolymer, the utility or end use of the copolymers, the commercial availability and relative costs of the particular monomers, and other criteria, all of which are well established and known in the art. For example, the use of methyl methacrylate is known to impart hardness and durability, and some solvent resistance to films or coatings. Butyl acrylate and butyl methacrylate are known plasticizing monomers which impart flexibility for solvent resistance and some durability to films. Styrene is known to impart gloss and hardness to films made from acrylic copolymers.

The polymerization techniques used to obtain the novel polymers and copolymers of this invention are those established heretofore for the homo- and copolymerization of the comonomers employed in conjunction with the novel monomers of the present invention. The polymerization can be conducted in bulk, in solvent solution or in aqueous emulsion. In general, the polymerization is conducted at temperatures of 0° C. to 150° C. and preferably in the range of 20° C. to 75° C. The polymerization is normally initiated by means of a free radical polymerization catalyst in the polymerization mix, the concentration of which can vary from about 0.001% to about 2.0% by weight of the monomer composition. Any free-radical initiator soluble in the polymerization solvent can be used in the practice of this invention, such initiators being well-known. The initiator can be an azo catalyst, a peroxygen compound, peroxide, or a hydroperoxide. Representative initiators which can be used include azo-bis-isobutyronitrile, tert-butyl peracetate, lauroyl peroxide, benzoyl peroxide, di-tert-butyl peroxide, tert-butyl hydroperoxide, cumene hydroperoxide, dicumene hydroperoxide, caprylyl peroxide, acetyl peroxide, p-chlorobenzoyl peroxide, t-butyl peroxyisobutyrate, hydroxyheptyl peroxide, cyclohexane peroxide, t-butyl perbenzonate, methyl ethyl ketone peroxide, p-methane hydroperoxide, 2-5 dimethyl-2,5 dihydroperoxide, 2-(2' hydroxy ethyl azo)-2,4-dimethyl valeronitrile, and azo-dicyclohexane carbonitrile.

The invention is illustrated by the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the preparation of certain of the monomers used to prepare the novel polymers of this invention.

(A) An isomeric mixture of 3-methyl-4-hydroxymethyl cyclohexene and 3-methyl-5-hydroxymethyl cyclohexene was prepared by the Diels-Alder reaction of piperylene and allyl alcohol at 220° C. The resultant alcohol mixture (43 gm.) was refluxed with methyl methacrylate (100 gm.) for six hours in the presence of 3.5 gms. of 5% solution of sodium in methanol and 2.5 gms. of p-methoxyphenol. Methanol was removed by axeotropic distillation during the reflux period. The desired product was isolated from the product mixture by distillation at 90–94° C. at 1.5 mm. Hg. The yield was 60.5 gms. (94.5%). The product is a mixture of isomers corresponding to the isomers of the alcohol.

(B) Cyclohexen-3-yl methyl methacrylate was prepared by reacting methyl methacrylate and 4-hydroxymethyl cyclohexene under the same conditions described in (A) above. The product is distilled at 55–65° C. at 0.3 mm. Hg.

EXAMPLE 2

This example illustrates the preparation of one of the novel homopolymers of this invention.

Ten parts of the monomer prepared in Example 1(A) were dissolved in one hundred parts of benzene, and one-tenth part of azo-bis-isobutyronitrile was added. The solution was refluxed in a nitrogen atmosphere for twenty-four hours. The polymer was recovered by precipitating a benzene solution into methanol, followed by vacuum drying. 7.2 parts of the white powdery polymer was obtained. The molecular weight of the polymer was 4900 (vapor phase osmometer, benzene solution).

A fifty percent solution of the polymer in xylene was prepared. Cobalt naphthenate was added so that the amount of cobalt was 0.05 wt. percent. Methyl ethyl ketone peroxide was added at 1 wt. percent level. A 0.003 in film was drawn on glass with a doctor blade. After three days, several drops of xylene resting on the film for 10 minutes caused only a slight haze to develop. After two weeks, methyl ethyl ketone caused only slight hazing in a similar test.

After two months, the film was removed from the glass and extracted with benzene for six hours. Only 15% of the film was removed by extraction.

EXAMPLE 3

This example illustrates the preparation of one of the novel copolymers of this invention.

A three neck flask was fitted with a stirrer, thermometer, nitrogen inlet, dropping funnel, and condenser. Xylene (48 pts.) and butanol (24 pts.) were charged, sparged with nitrogen for 30 minutes, and heated to reflux. A solution of 45 pts. of methyl methacrylate, 45 parts of ethyl acrylate, 18 parts of cyclohexene-3-yl methyl methacrylate prepared in Example 1(B) and 0.65 pts. of azo-bis-isobutyronitrile was placed in the dropping funnel. After a thirty minute nitrogen sparge, the solution was added evenly over a two hour period to the refluxing solution. One hour after the monomer addition was complete, 0.43 part of di-t-butyl peroxide was added and reflux was continued for four hours. The solution was 58% non-volatile and had a viscosity of 35 strokes at 26° C.

EXAMPLE 4

This example illustrates the preparation of the novel copolymers of this invention by emulsion polymerization.

A mixture of the following unsaturated esters was prepared: methyl methacrylate (16.9 pts., 30 mol percent); ethyl acrylate (33.8 pts., 60 mol percent); methyl cyclohexenylmethyl methacrylate (10.9 pts., 10 mol percent).

This was charged to a reaction vessel fitted with a stirrer, thermometer, dropping funnel, condenser, and nitrogen inlet. Water (100 pts.), an anionic emulsifier, Triton X–200 (6.4 pts.), a 0.15 percent aqueous solution of ferrous sulfate (1 pt.), and ammonium persulfate (0.25 pt.) were added and the mixture was stirred and sparged with nitrogen for 30 minutes. The solution was cooled to 20° C. and sodium meta-bisulfite (0.25 pt.) and t-butyl hydroperoxide (0.05 pt.) were added An exotherm developed which reached a maximum of 64° C. after 25 minutes. The emulsion was cooled and filtered through a fine mesh screen. The non-volatile content of the emulsion was 36.3%. The emulsion formed a clear film at room temperature.

EXAMPLES 5–13

This example compares the film properties of acrylic copolymers of this invention with analogous copolymers not containing cyclohexenyl-alkyl ester monomers.

A series of copolymers of methyl methacrylate, ethyl acrylate, and a third monomer was prepared by the method of Example 3. Films of the resins were applied to a metal plate (about 3.0 mil, wet film) and air dried. Catalysts were added in some cases. The films were tested for Sward hardness after 24 hours and two weeks, and for solvent solubility by extraction of 28 day aged films in a Soxhlet extractor for 6 hours with benzene solvent. The composition of the various copolymers and the test results are tabulated in Table I below.

It will be noted that the only copolymers which formed benzene resistant (insoluble) films were those which contain the polymerized unsaturated esters in accordance with this invention.

ates. Cobalt naphthenate is particularly preferred. The addition of a secondary catalyst which can advantageously be a peroxide such as methyl ethyl ketone peroxide may further hasten the curing of the novel resins of this invention. The secondary catalyst can be employed in amounts similar to those of the primary catalyst.

Although the invention has been described in considerable detail with reference to certain preferred embodiments thereof, it will be understood that variations and modifications can be effected within the spirit and scope of the invention as described above and as defined in the appended claims.

What is claimed is:

1. A polymer comprising the addition polymerization product of from 1 to 100 parts of a vinyl monomer (A) having the formula:

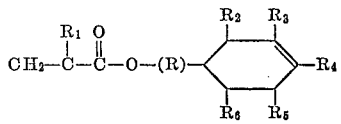

wherein R is lower alkylene having from 1 to 4 carbon atoms; $R_1$ is hydrogen or methyl; and $R_2$, $R_3$, $R_4$, $R_5$ and $R_6$ are selected from the group consisting of hydrogen, lower alkyl having from 1 to 4 carbon atoms, halogen and alkoxy having from 1 to 4 carbon atoms, and (B) from 0–99 parts by weight of a second monomer selected from copolymerizable ethylenically unsaturated compounds, said parts by weight equaling 100.

2. The polymer of claim 1 wherein said first polymerized monomer (A) comprises 100 parts by weight of said polymer.

TABLE I

| | Resin composition (mol percent) | | | Cure agent, wt. percent | Film properties | | |
|---|---|---|---|---|---|---|---|
| Ex. | MMA | EA | Other | | Sward (24 hrs.) | Sward (2 wks.) | Percent unextracted (28 day aged) |
| 5 | 45 | 45 | MCMMA, 10 | None | 10 | 22 | 0 |
| 6 | 45 | 45 | MCMMA, 10 | 0.05 Co | 12 | 32 (HB−) | 48 |
| 7 | 45 | 45 | MCMMA, 10 | 0.05 Co, 1.0 MEKP | 12 | 30 (HB) | 60 |
| 8 | 45 | 45 | EHMA, 10 | 0.05 Co, 1.0 MEKP | 6 | 14 | 0 |
| 9 | 45 | 45 | CHMA, 10 | 0.05 Co, 1.0 MEKP | 8 | 22 | 0 |
| 10 | 45 | 45 | CMMA, 10 | 0.05 Co, 1.0 MEKP | 8 | 24 | 67 |
| 11 | 45 | 45 | THFMA, 10 | 0.05 Co, 1.0 MEKP | 6 | 24 | 0 |
| 12 | 45 | 35 | CSA, 10; EMA, 10 | 0.05 Co, 1.0 MEKP | 6 | 14 | 0 |
| 13 | 45 | 45 | AOMA, 10 | (Resin gel in synthesis) | | | |

NOTE: MMA=Methyl methacrylate; EA=Ethyl acrylate; MCMMA=Methylcyclohexyl-methyl methacrylate; EHMA=2-ethylhexyl methacrylate; CHMA=Cyclohexyl methacrylate; CMMA=Cyclohexenyl methyl methacrylate; THFMA=Tetrahydrofurfuryl methacrylate; CSA=Cellosolve acrylate; AOMA=Allyloxyethyl methacrylate; Co=Cobalt (as naphthenate); MEKP=Methyl ethyl ketone peroxide.

The cyclohexenyl-alkyl alcohol or alkylcyclohexenyl-alkyl alcohols ester monomers which are polymerized to give the novel polymers of this invention can be obtained by known esterification methods. For instance, they can be obtained by the esterification of the corresponding cyclohexenyl-alkyl alcohol with the proper α,β-unsaturated acids or by the trans-esterification of the alcohol with an ester of the unsaturated acid. The cyclohexenyl-alkyl alcohols are prepared by the Diel-Alder reaction of a diene and an unsaturated alcohol.

As discussed hereinabove, films formed from the polymers or copolymers of this invention are air oxidizable at ordinary room temperatures. The oxidation may proceed rather slowly but can be speeded up by the addition of catalysts or by heating. Curing may be hastened by the addition of a catalyst such as a metal carboxylate which can be added to the novel resins in minor amounts up to about 1% by weight. Carboxylates of metals such as copper, iron, manganese, zinc, nickel, or cobalt, which is preferred, can be used in the form of their naphthenates, octoates, acetates, maleates, or linoresin- 3. The polymer of claim 1 wherein said first polymerized monomer (A) comprises at least 10 parts by weight of said polymer.

4. The polymer of claim 1 wherein R is methylene and each of $R_2$, $R_3$, $R_4$, $R_5$, and $R_6$ is hydrogen.

References Cited

UNITED STATES PATENTS

| 2,863,881 | 12/1958 | Phillips et al. | 260—617 |
| 2,863,925 | 12/1958 | Starcher | 260—617 |
| 2,873,297 | 2/1959 | Ramsden | 260—617 |
| 2,999,866 | 9/1961 | Starcher et al. | 260—617 |

HARRY WONG, JR., Primary Examiner

U.S. Cl. X.R.

117—124; 260—33.6, 78.4, 78.5, 80.75, 80.81, 85.5, 86.1, 86.3, 86.7, 89.3, 91.3, 486, 617